Nov. 11, 1969 A. J. WOITAS 3,477,514
HILLER ATTACHMENT FOR GARDEN TRACTORS
Original Filed Sept. 1, 1965

United States Patent Office 3,477,514
Patented Nov. 11, 1969

3,477,514
HILLER ATTACHMENT FOR GARDEN TRACTORS
Andrew J. Woitas, P.O. Box 35, Bruderheim,
Alberta, Canada
Continuation of application Ser. No. 484,356, Sept. 1, 1965. This application Dec. 16, 1968, Ser. No. 785,452
Int. Cl. A01b 33/02, 33/10; E02f 5/04
U.S. Cl. 172—42                                    1 Claim

ABSTRACT OF THE DISCLOSURE

A garden tractor having a drive axle projecting to opposite sides from a power-driven transmission. A hiller attachment for the tractor consists of a pair of screw augers removably mounted on the axle at opposite sides of the transmission. Each auger has a hub and a spiral blade which decreases in radial dimension from the inner to the outer end of the hub. The marginal edge of the blade is provided with tooth-like indentations.

---

This is a continuation of application Ser. No. 484,356, filed Sept. 1, 1965, now abandoned.

This invention relates to hiller attachments for use with garden tractors of the type which are controlled by a walking operator.

It is one object of this invention to provide hiller attachments which may be readily and removably affixed to the driven axle of a garden tractor.

It is a further object of this invention to provide hiller attachments which will be readily adapted for use with standard garden tractors of the type which are steered and controlled by a walking operator.

A further object of the invention is to provide hiller attachments for garden tractors which will propel the tractor forward in the place of ordinary drive wheels, and at the same time create a mound or hill of earth on each side of the moving tractor, leaving a ditch between, the mounds or hills of earth so created being useful for potatoes and similar crops.

A still further object of the invention is to provide hiller attachments for garden tractors of the type controlled by a walking operator and having a power-rotated drive axle comprising in combination a pair of screw augers each having a hub adapted to be removably mounted on the drive axle of a garden tractor and rotated thereby, one of said augers being so mounted on each side of said drive axle, a spiral earth-moving blade integral on each of said hubs, said screw augers being adapted to move earth to each side of said garden tractor during rotation of said axle and at the same time to propel said tractor forwardly.

Referring now to the drawings.

More detailed reference will now be made to the drawings, although it should be understood that the following description is by way of example only, and that the invention should be limited only by the scope of the appended claims.

Figure 1:
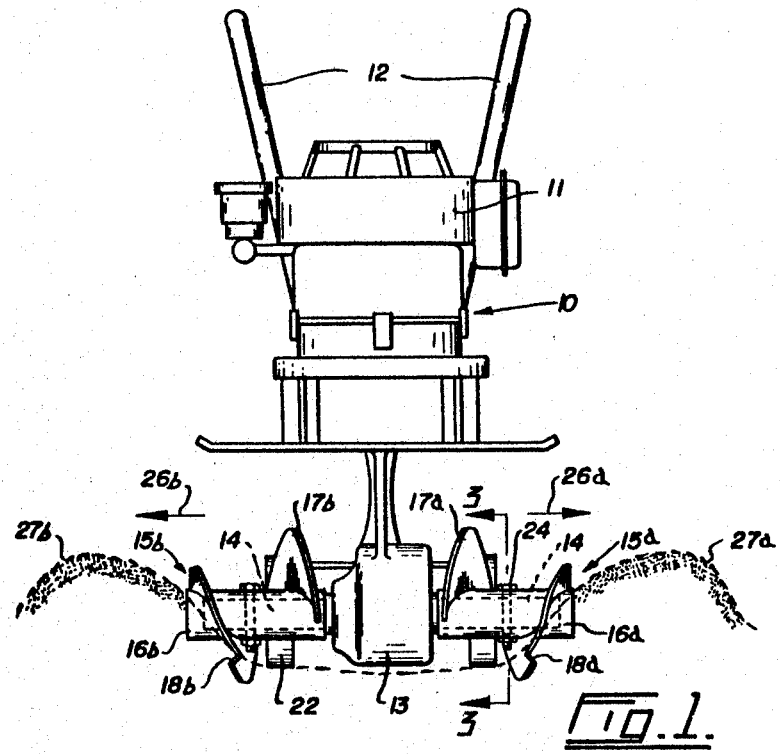
FIGURE 1 is a front elevation of a garden tractor with hiller attachments according to the invention affixed thereto.

In FIGURE 1 a garden tractor is indicated generally at 10, the power unit may be of any standard design, and is indicated at 11. Handles 12 are also shown. Garden tractor 10 is of the type having a transmission 13, which transmits power to drive axle 14, shown in broken lines in FIGURE 1. Ordinarily, wheels (not shown) will be mounted on axle 14, so as to propel the tractor, as is well known.

Screw augers 15a and 15b are shown mounted on axle 14 in FIGURE 1, and consist of hubs 16a and 16b, and spiral earth moving blades 17a and 17b respectively. Spiral earth moving blades 17a and 17b are integral with hubs 16a and 16b respectively, and are spirally mounted thereon as is most evident in FIGURE 1. Moreover, spiral blade 17a spirals outwardly around hub 16a in a clockwise direction, while spiral blade 17b, spirals outwardly around hub 16b in a counterclockwise direction. As is seen most clearly in FIGURE 2, spiral earth moving blade 17a consists of a first blade portion having a continuous unbroken edges extending around hub 16a and diminishing in blade height toward the outside said hub, and a tooth-like indentation 18a is provided near the centre of spiral blade 17a, terminating said first blade portion and providing an inward radial step to the marginal edge of a second blade portion, the latter having a continuous, unbroken edge extending around the remaining part of the hub 16a terminating in a second indentation providing an inward radial step extending to the outer end of said hub. Corresponding indentations are of course provided on screw auger 15b, and indentation 18b is illustrated in FIGURE 1.

Referring again to FIGURE 2, depth guide 20 is vertically adjustable on the frame 21 of the tractor 10. Together with guide wheel 22, depth guide 20 will assist in controlling the depth to which screw augers 15 will move earth, and hence the height of the hills created on either side of auger 15, as will be explained hereinafter.

Figure 3:
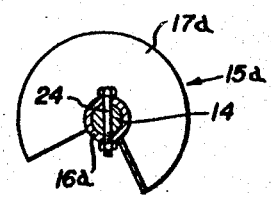
FIGURE 3 is a sectional view taken along line 3—3 of FIGURE 1.

As most clearly illustrated in FIGURES 1 and 3, a bolt 24 is passed through aligned holes in hub 16, and through a mating hole in axle 14. Screw augers 15 may thus be readily affixed to drive axle 14, and equally readily removed therefrom, when it is desired to use the garden tractor 10 with standard drive wheels.

Figure 2:
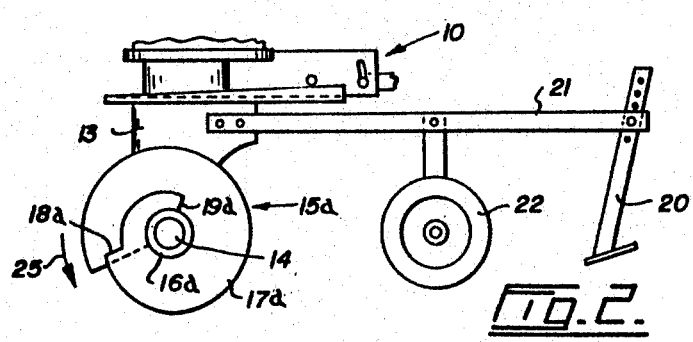
FIGURE 2 is a partial side view of the garden tractor of FIGURE 1 with engine and handles not shown.

In operation, screw augers 15 will rotate the direction of arrow 25 shown in FIGURE 2, that is in a forward direction, and as augers 15 rotate the garden tractor 10 will be propelled forward. At the same time, spiral earth moving blades 17 will bite downwardly into the earth, and at the same time augers 15a and 15b will move earth in the directions of arrows 26a and 26b respectively, that is outwardly on both sides of tractor 10, creating hills of earth 27a and 27b respectively (see FIGURE 1). Thus, two parallel hills 27a and 27b, required in the cultivation of potatoes and similar crops, are quickly and conveniently created by a conventional garden tractor, utilizing the novel screw augers of the invention.

What is claimed as new is:
1. The combination of a garden tractor including a power-driven transmission and a drive axle projecting laterally outwardly to opposite sides from said transmission, and a hiller attachment comprising a pair of tapered screw augers removably mounted on said axle at the opposite sides of the transmission, said screw augers being fixed for rotation with said axle in the direction of travel of the tractor and being effective to move earth laterally to opposite sides of the tractor while propelling the tractor forwardly, each of said augers comprising an elongated tubular hub having inner and outer ends respectively adjacent to and remote from said transmission, and a spiral blade consisting of a first blade portion having a continuous unbroken edge extending around said hub in a progressively decreasing spiral, said first blade portion terminating at a point intermediate the ends of said blade with an indentation providing an inward radial step to the marginal edge of a second blade portion, said indentation being of substantial depth in relation to the radial dimension of the blade, and said second blade portion having a continuous unbroken edge extending around the remaining part of the hub in a progressively decreasing spiral terminating with an indentation providing an inward radial step extending to the end of said hub.

References Cited

UNITED STATES PATENTS

| | | | |
|---|---|---|---|
| 1,667,880 | 5/1928 | Byrd | 172—116 X |
| 2,649,723 | 8/1953 | Tubbs | 172—532 |
| 3,226,855 | 1/1966 | Smith | 37—81 |
| 3,282,353 | 11/1966 | Troyer et al. | 172—43 |

FOREIGN PATENTS

| | | |
|---|---|---|
| 8,658 | 3/1960 | Japan. |
| 201,327 | 12/1958 | Austria. |

ROBERT E. BAGWILL, Primary Examiner

S. C. PELLEGRINO, Assistant Examiner

U.S. Cl. X.R.

37—81; 172—119